United States Patent [19]
Simard

[11] 3,787,927
[45] Jan. 29, 1974

[54] FISH SCALING MACHINE

[76] Inventor: Albert Simard, R.R. 1, Old Castle, Ontario, Canada

[22] Filed: May 26, 1972

[21] Appl. No.: 257,392

[52] U.S. Cl. .................................................. 17/64
[51] Int. Cl. .......................................... A22c 25/02
[58] Field of Search............................ 17/64, 21, 50

[56] References Cited
UNITED STATES PATENTS

| | | | |
|---|---|---|---|
| 3,088,164 | 5/1963 | Simard.................................... | 17/64 |
| 2,664,591 | 1/1954 | Brophy ................................... | 17/64 |
| 2,722,037 | 11/1955 | Thies ...................................... | 17/64 |
| 2,702,922 | 3/1955 | Thibodeau.............................. | 17/64 |

Primary Examiner—Louis G. Mancene
Assistant Examiner—D. L. Weinhold
Attorney, Agent, or Firm—Cullen, Settle, Sloman & Cantor

[57] ABSTRACT

In a fish scaling machine having a horizontally disposed fish conveyor with a series of spaced descaler rolls extending at right angles to the direction of feeding with the fish fed by the conveyor in a continuous manner, an improved hold down and guide mechanism operatively and yieldably engaging one side of the fish as they move thereunder which includes mounted upon a pair of spaced rails a series of spaced rock shafts journalled on said rails and supporting a series of fan-shaped longitudinally overlapped downwardly and rearwardly converging blades which are affixed to said rock shafts and with spring means for urging the undersurface portions of said blades into operative yieldable engagement with the fish as they pass thereunder.

5 Claims, 9 Drawing Figures 3,787,927

FISH SCALING MACHINE

BACKGROUND OF THE INVENTION

The present invention is an improvement over the fish scaling machine shown in my earlier issued U.S. Pat. No. 3,088,164 dated May 7, 1963.

Whereas, the earlier patent was primarily directed to the complete machine, the present invention has for its primary object an improved yieldable spring biased blade mechanism for engaging one side of the fish as they are conveyed through the machine, their opposite side being engaged by a series of longitudinally spaced descaler rolls.

It is another object to provide an improved fish scaling machine wherein, and as a part of the framework, there is provided above the conveying means, a pair of rails and mounted upon axes transverse to the path of movement of the fish a series of longitudinally overlapped fan-shaped blades whose opposite sides extend downwardly and whose forward ends converge rearwardly so as to yieldably engage fish as they are conveyed thereunder.

It is an object of the present invention to provide first conveying mechanism with a series of longitudinally spaced descaler rolls substantially coplaner therewith so as to operatively engage and remove the scales from one side of a fish movable thereover and, wherein, the present improved resilient hold-down or fish engaging means operatively and yieldably engage the opposite side of the fish during the descaling operation.

It is a further object of the present invention to provide an exact reverse of the above mechanism and, wherein, the upper side of the fish are engaged by the conveying means and a series of descaler rolls so as to remove scales from the opposite side and, wherein, the yieldable hold-down mechanism operatively engages the under side of the fish as it moves thereover to hold the same into engagement with the conveyor and descaling rolls.

It is another object to provide an improved yieldable spring biased hold-down device in the nature of a fan-shaped blade, wherein, each blade is made into a pair of sections adapted for independent pivotal yielding fish engaging movements.

It is another object to provide an improved descaler roll for the fish scaling machine and, wherein, the blades are so formed as to additionally guide the fish moving in a rectilinear path and further, wherein, the blades are formed so as to operatively deflect the scales in a continuous manner.

These and other objects will be seen from the following specification and claims in conjunction with the appended drawings in which:

Figure 1:
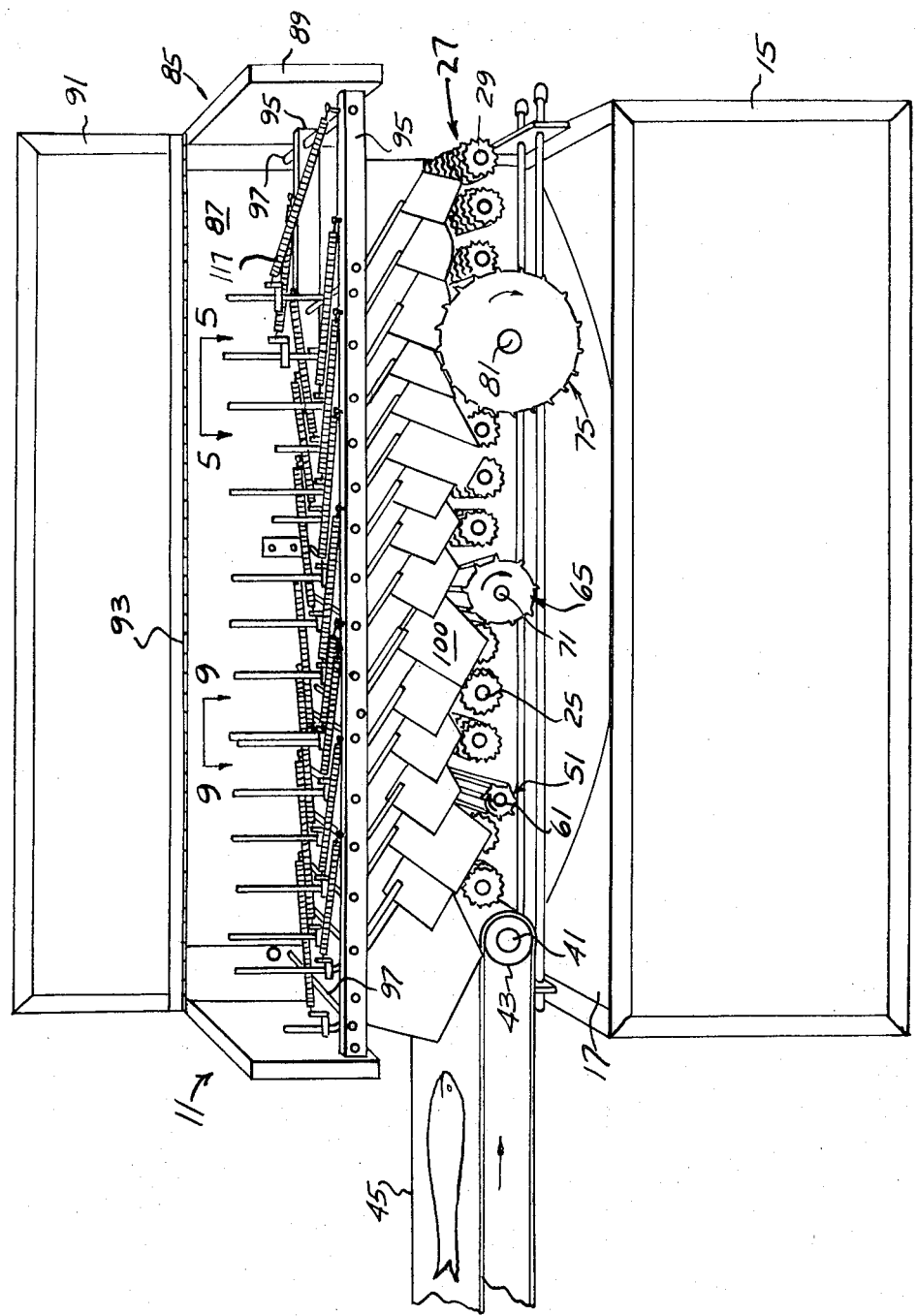
FIG. 1 is a front perspective view of the present fish scaling machine.

It is will be understood that the above drawings illustrate merely a preferred embodiment of the invention, and that other embodiments are contemplated within the scope of the claims hereafter set forth.

DETAILED DESCRIPTION

Referring to the drawings, the present fish scaling machine generally indicated at 11 has a framework 13 with an associated longitudinally disposed tank 15.

Concave guide plates 17 extend partly across the top of said tank for guiding removed scales down into the tank.

The framework includes a pair of spaced longitudinally extending rails 19 mounting thereon opposed pairs of journal blocks 23 adapted to receive and journal the individual drive shafts 25 for the conveyor rolls 27.

These conveyor rolls are longitudinally spaced along the length of the framework and rotate on axes extending at right angles to the path of feed movement of fish to move thereover in a continuous manner as shown in FIG. 1.

Each of the feed rolls 27 include a series of longitudinally spaced sharpened sprockets 29 affixed to the power rotated shaft 25.

Figure 7:
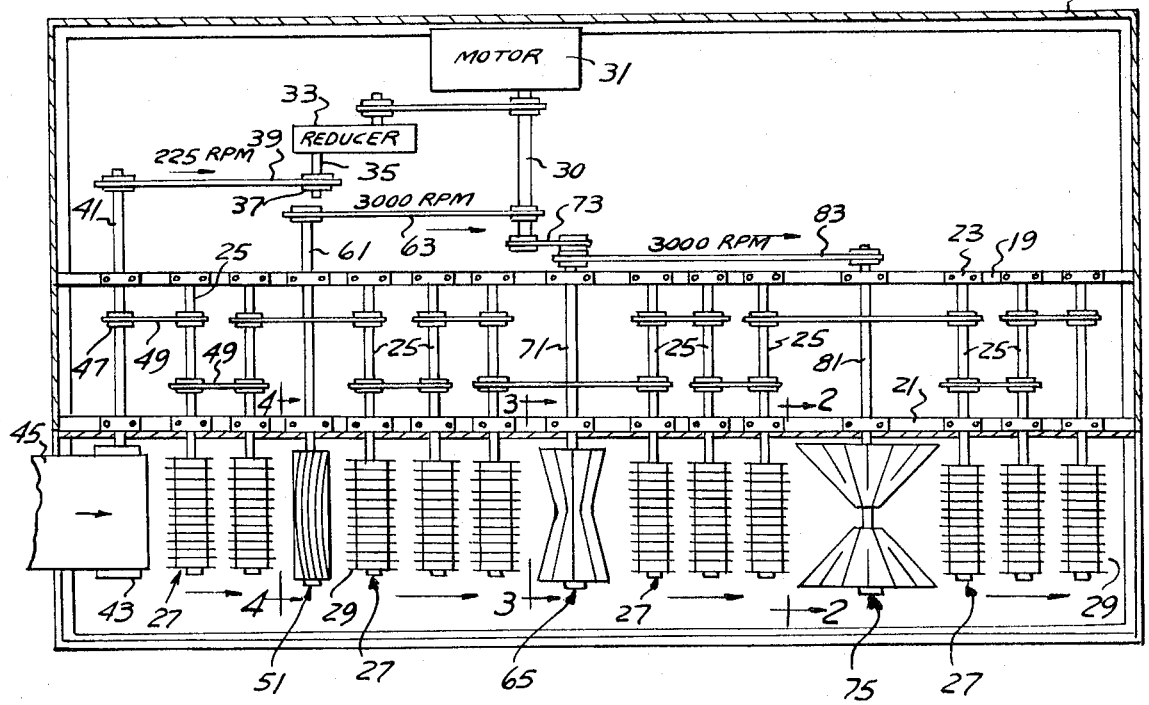
FIG. 7 is a fragmentary plan view of the fish scaling machine, showing the conveying mechanism, the descaler rolls and the power drive mechanism therefore.

Motor 31 schematically shown is operably connected to reducer 33, FIG. 7 whose output shaft 35 drives pulley 37 which through a suitable belt 39 and another pulley drives shaft 41, at 225 R.P.M. for illustration. Mounted upon the end of said shaft is a feed roll 43 for the belt conveyor 45, fragmentarily shown, by which the fish successively are advanced in a line onto the conveyor mechanism forming a part of the present fish scaling machine and which includes the series of longitudinally spaced transverse feed rolls 27.

Power driven shaft 41 for the roller 43 by virtue of a series of additional pulleys and belts between the respective additional shafts 25 are thus adapted to effect simultaneously continuous power driven rotation of the respective feed rolls 27 forming a part of the conveyor.

While pulleys and belts have been shown, it is contemplated that sprockets and chains could be just as well employed as an equivalent drive mechanism.

By this construction, the roller 43 with the feed belt 45 moves in unison with each and all of the sprocket type feed rolls 27 for transmitting fish throughout the length of the present scaling machine.

A series of longitudinally spaced differently shaped descaler rolls 51, 65 and 75 are interposed within and between respective sets of the feed rolls 27 and are adapted to operatively engage one side of the fish as it moves over the conveyor rolls.

Figure 4:
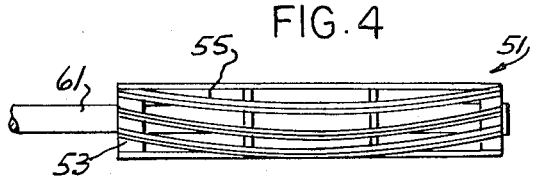
FIG. 4 is another form of descaler roll taken on lines 4—4 of FIG. 7.
Figure 8:
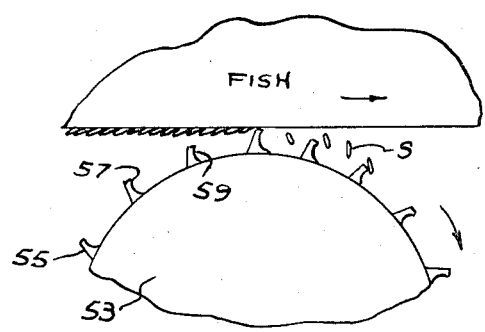
FIG. 8 is a fragmentary end elevational view of one of the descaler rolls shown in FIG. 7 illustrating the relation between roll and a fish in removing the scales therefrom.

The first descaler roller 51 shown on an enlarged scale in FIG. 4 includes between the end support discs 53 a series of elongated downwardly depressed or curved blades 55 which are shown fragmentarily in side elevation in FIG. 8 as the blades would engage the fish moving thereover.

Each of the blades is inclined forwardly at an acute angle with respect to a normal line to the blade support axis and includes a leading downwardly curved edge 59 for the purpose of operatively deflecting the scales S as they are removed from the fish as shown schematically in FIG. 8.

Figure 2:
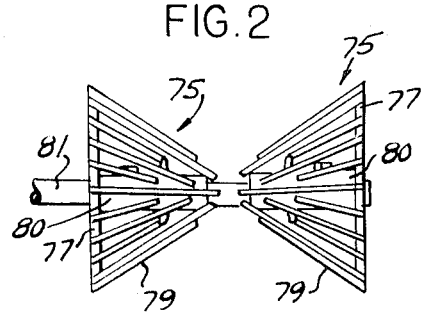
FIG. 2 is an end elevational view of one descaler roll taken in the direction of arrows 2—2 of FIG. 7 on an enlarged scale.
Figure 3:
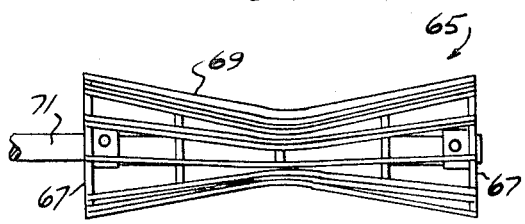
FIG. 3 is a similar view of another form of the descaler roll taken on lines 3—3 of FIG. 7.

This same construction of the elongated blade forwardly inclined and with the curved leading edge 59 is characteristic of all three of the descaler rolls shown in FIGS. 2, 3 and 4.

The descaler roll 51 is affixed to the driven shaft 61 which is parallel to feed roll drive shafts 25 and through suitable pulleys and a belt 63 is connected to the output shaft 30 of motor 31.

Since it is directly connected to said motor, the descaler roll 51 may rotate at 3000 R.P.M. for illustration.

Of importance in connection with the feed roll 51 is that it is concaved intermediate its ends to therefore serve as a guide means for assuring a path of rectilinear movement for the fish as they move thereover upon their one sides.

There is provided a centrally spaced additional descaler 65 also shown in FIG. 3 wherein between the support plates 67 mounted upon driven shaft 71 are a series of more steeply and inwardly inclined blades 69 for the purpose of operatively engaging side portions of the fish not engaged by the first descaler roll 51.

The central depressed portion of the descaler roll also functions to centralize and to assure and guide the fish along a rectilinear path.

Driven shaft 71 is also mounted upon the supports 19 and 21 of the framework and corresponding journal blocks and through suitable pulleys and belt 73 is connected to motor shaft 30 and is power rotated also at 3000 R.P.M., for illustration.

A third descaler roll 75 is provided at FIGS. 1, 2 and 7 and wherein upon the driven shaft 81 fragmentarily shown is provided an opposed pair of blade elements 75 and wherein, the support discs 77 mount a suitable bushing 80. The steeply inclined blades 79 at their one ends are secured to the discs 77 and at their other ends extend to and are affixed or suitably secured by welding or otherwise to the bushing 80.

Thus, this opposed pair of rolls 75 with their blades at an increased and steeper angle than the angle of the blades 69 are furthermore adapted to operatively engage other side portions of the fish in order to remove the remainder of the scales as the fish passes thereover.

Power drive shaft 81, which extends through the bushings 80 and is affixed thereto, is parallel to the other shafts 71, 61 and 25. Shaft 81 through suitable pulleys shown in FIG. 7 and a belt 83 is connected to the motor output shaft 30 for power rotation at 3000 R.P.M., approximately.

HOLD DOWN AND GUIDE MECHANISM

Referring to FIG. 1, as the fish lying on one side is fed by the belt 45 onto the conveyor rolls 27, its undersurface is operatively engaged by the longitudinally spaced descaler rolls 51, 65 and 75 which due to their different shapes, and the inclination of the respective cutting blades are adapted to remove the scales from the said one side of the fish.

During this scale removing operation, there is provided an improved resilient yieldable hold down mechanism which operatively but yieldably engages the opposite sides of the fish as it moves along a rectilinear path upon the conveyor rolls throughout the length of the machine.

In the present embodiment of the improved hold down mechanism there is provided as a part of the framework 13 a hollow U-shaped laterally extending framework 85 which includes upright back wall 87 and at its opposite ends laterally extending longitudinally spaced end walls 89.

Figure 5:
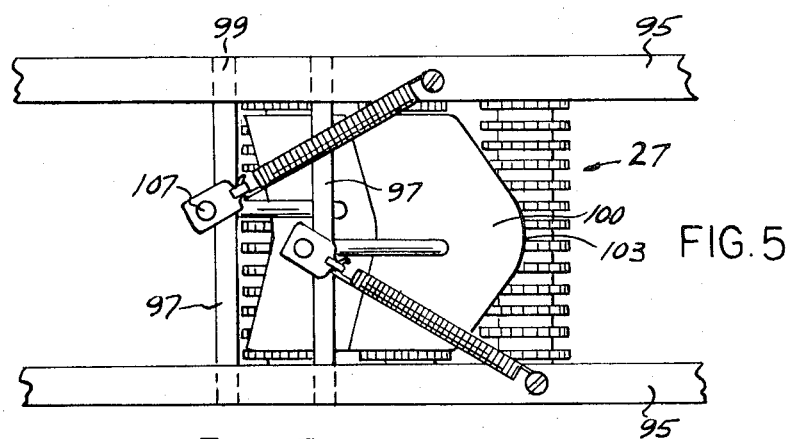
FIG. 5 is a fragmentary plan view of the improved fish hold-down mechanism taken in the direction of arrows 5—5 of FIG. 1, on an increased scale.
Figure 6:
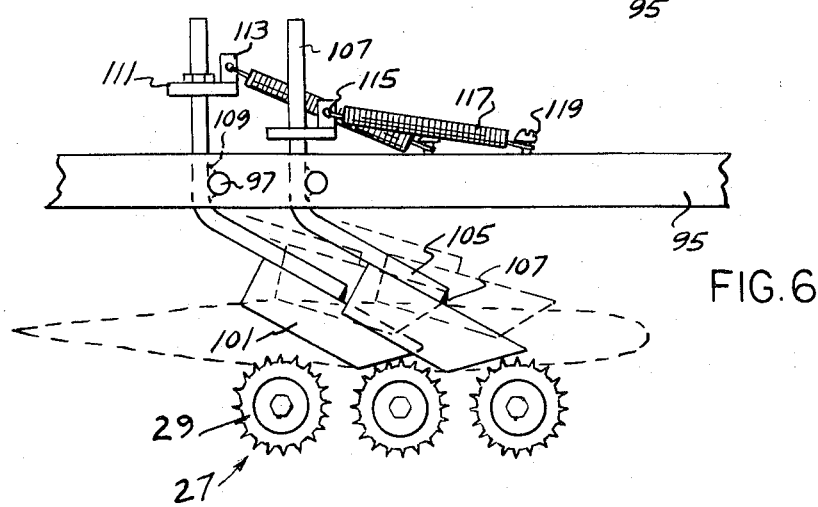
FIG. 6 is a fragmentary side elevational view thereof.

The elongated rectangular top 91 is hinged at 93 to back wall 87 and is adapted to cooperatively register with the end walls 89 so as to partly enclose the upper portion of the fish scaling machine and particularly the yieldable hold down mechanism shown in FIG. 1, and in detail in FIGS. 5 and 6.

The present yieldable hold down mechanism includes as a part of the basic framework 13 a pair of laterally spaced longitudinally extending rails 95 which are spaced above feed rolls 27 and descaler rolls 51, 65, 75 and upon which are mounted the present fan-shaped longitudinally overlapping blades 100, FIG. 5. These are adapted to operatively engage the opposide side of the fish during the descaling operation.

For this purpose there are provided spanning the said rails a series of longitudinally spaced rock shafts 97 journalled as at 99 with suitable bushings if desired within the rails 95.

There are a plurality of fan-shaped longitudinally overlapping and longitudinally extending blades 100 whose opposite sides 101 extend angularly outward and downward and whose forward end portions as at 103, FIGS. 5 and 6 converge rearwardly. These blades are of such shape as to operatively engage yieldably the opposide side of the fish from which the scales are being removed as shown in FIG. 1.

It is noted that the respective fan-shaped blades 100 are each independently mounted for its own pivotal yielding movements with respect to the fish moving thereunder in the illustrative embodiment.

The mounting of the respective blades 100 includes for each blade a support bar 105 which is inclined upwardly and rearwardly corresponding to the inclination of the respective blades 100, FIG. 6, and affixed thereto as at 107. As shown in FIG. 5, said bars are laterally displaced with respect to the longitudinal axis of the individual blade so as to provide suitable clearance for the succeeding and adjacent support bars of adjacent blades in the overlapping manner shown, FIGS. 1 and 5.

The said support bars thus extend upwardly and rearwardly, past the corresponding rock shafts 97, are affixed to the respective rock shafts as by welds 109, FIG. 6, and thereafter extend upwardly in a vertical direction as at 107, FIG. 6.

Brackets 111 are adjustably mounted upon support bar elements 107 suitably secured thereto, each bracket including an apertured ear 113 which receives as at 115 one end of the elongated coil spring 117 whose opposite end is anchored to one of the support rails as at 119.

By this construction, the respective successively aligned and overlapped fan-shaped blades 100 are always biased towards the descaling rolls and, thus, are adapted to yieldably engage the opposite side of the fish as it moves over the descaler rolls on the feed conveyor 27 to assist in the descaling operation.

It is contemplated as a part of the present invention, though not described in further detail that in order to remove the scales from the other side of the fish, there would be arranged in identical construction of feed rollers 27 and descaler rolls 51, 65 and 75 in alignment with the end portion of the descaler mechanism shown in FIGS. 1 and 7, and wherein the descaler rolls are adapted to operatively engage the opposite side of the fish and wherein the hold down mechanism, namely, the series of aligned overlapping fan-shaped blades 100 engage the underside of the fish for the purpose of holding the fish against the descaler rolls.

Accordingly, the present invention contemplates in a fish scaling machine a device which is substantially a duplicate of what is shown in FIG. 1 but wherein, the rollers 27 for feeding and the descaler rolls are reversed and are arranged above rather than below the fish and wherein, the yieldable hold down mechanism is upon the underside of the fish to hold the fish against the conveyor mechanism.

By this construction, the fish are successively moved in a continuous line through the descaler machine, through the mechanism shown in FIG. 1 and through an additional mechanism aligned with FIG. 1 wherein, the opposite side of the fish is descaled to complete the scaling operation of this fish successively in a continuous line to thus provide fish scaling in a commercial manner providing for thousands of fish passing through per hour.

MODIFICATION

Figure 9:
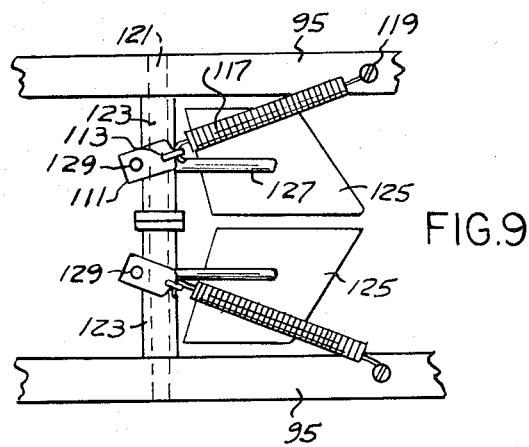
FIG. 9 is a plan view of a modified yieldable hold-down mechanism.

FIG. 9 shows a slight modification only in the sense that between the rails 95 forming a part of the framework instead of a single set of fan-shaped blades, there are instead provided opposed pairs of blade elements 125 which are independently mounted for the same purpose. Since they operate independently of each other, they may be more efficient for certain types of fish scaling operations due to surface irregularities of the fish passing between the hold down mechanism and the descaler rolls.

For this purpose upon the transverse shafts 121 longitudinally spaced and arranged between the rails 95 are a pair of sleeves 123 arranged end to end and adapted for rocking adjustment independently with respect to the transverse shaft 121.

Individual opposed symmetrical blade elements 125 are arranged side by side being generally of the shape of the blades 100 of FIGS. 5 and 6 but which have independent mountings. Each of the blade elements has along its top surface an elongated inwardly and upwardly extending support bar 127 suitably secured to the individual blade, which extends upwardly passed the corresponding bushing 123 and is suitably affixed thereto by welding the same as at 109, FIG. 6, and extends upwardly terminating in the vertical portion 129.

This portion again mounts a bracket 111 similar to the bracket of FIGS. 5 and 6 which is adjustably secured upon the vertical portion 129 of the support bar and serves to anchor one end of the coil spring 117, whose opposite end is again secured to the corresponding adjacent rail 95 as at 119.

The structure is otherwise the same except that the fan-shaped fish engaging hold down blade elements are in pairs rather than single blade 160 shown in FIG. 5.

The structure and function is the same but there is provided a more efficient device for engaging the opposite side of the fish which is irregular in cross section and thus, is adapted to more efficiently hold down that side of the fish with respect to the opposite side which is engaged by the series of descaler rolls 51, 65 and 75.

Having described my invention, reference should now be had to the following claims.

I claim:

1. In a fish scaling machine having a framework, a horizontally disposed conveyor adapted to supportably receive one side of a fish longitudinally movable thereover, and a series of longitudinally spaced descaler rolls, journalled upon said framework on axes at right angles to the direction of feeding adapted to operatively engage said one side of said fish removing the scales therefrom as the fish are fed thereover in a continuous manner;

an improved hold down and guide mechanism operatively, yieldably and successively engaging along the other side of said fish comprising;

a pair of spaced horizontally disposed rails mounted on said framework and spaced from said descaler rolls;

a series of longitudinally spaced rock shafts transverse to and journalled upon said rails;

a series of fan-shaped longitudinally overlapping blades whose opposite sides extend downwardly and whose forward end portions converge rearwardly to operatively engage said fish other side;

a support bar overlying and at one end secured to each blade and its other end extending rearwardly and upwardly extending beyond and fixedly secured to corresponding rock shaft;

and a series of spring means interconnecting each support bar and one of said rails respectively, whereby said blades yieldably and guidably engage said fish for movement in a rectilinear direction.

2. In the fish scaling machine of claim 1, said blades being inclined upwardly and rearwardly; each support bar extending along the top of a blade laterally offset from its central longitudinal axis, with its other end extending substantially vertical.

3. In the fish scaling machine of claim 2, the connection of said spring means to said support bar including a bracket adjustably secured thereto, to facilitate adjustment of spring tension upon said blades.

4. In the fish scaling machine of claim 1, each rock shaft consisting of a pair of aligned tubes; and a bar extending through and rotatably mounting said tubes, and at its ends secured to said rails; each blade consisting of a pair of oppositely arranged symmetrical blade elements, there being a separate support bar for each blade element and secured thereto, with portions of the support bars for each pair of blade elements bearing against and secured to the corresponding tube, whereby the blade elements are adapted for independent fish engaging movements.

5. In the fish scaling machine of claim 1, said framework including an upright back wall, and at its ends, a pair of laterally extending end walls overlying and enclosing said rails and associated hold-down and guide mechanism; and a tilt cover hinged to said back wall and adapted to rest upon said end walls, said rails at their respective ends being secured to said back wall.

* * * * *